United States Patent

Guo (10) Patent No.: US 12,123,781 B2
(45) Date of Patent: Oct. 22, 2024

(54) ELECTRONIC DEVICE, METHOD AND APPARATUS FOR MEASURING COLOR TEMPERATURE OF AMBIENT LIGHT, AND STORAGE MEDIUM

(71) Applicant: Beijing Xiaomi Mobile Software Co., Ltd., Beijing (CN)

(72) Inventor: Li Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/166,471

(22) Filed: Feb. 3, 2021

(65) Prior Publication Data

US 2021/0396589 A1     Dec. 23, 2021

(30) Foreign Application Priority Data

Jun. 22, 2020    (CN) .......................... 202010575901.9

(51) Int. Cl.
    *G01J 5/60*        (2006.01)
    *G01J 5/08*        (2022.01)
    (Continued)

(52) U.S. Cl.
    CPC . *G01J 5/60* (2013.01); *G01J 5/59* (2022.01); *G02B 5/3025* (2013.01);
    (Continued)

(58) Field of Classification Search
None
See application file for complete search history.

(56) References Cited

U.S. PATENT DOCUMENTS 9,613,562 B2 *   4/2017   Lee ........................ G06T 5/009
9,947,275 B1 *   4/2018   Ramanath ............ G09G 3/2003
(Continued)

FOREIGN PATENT DOCUMENTS

CN      101881657 A    11/2010
CN      204155595 U     2/2015
(Continued)

OTHER PUBLICATIONS

Extended European Search Report issued Oct. 6, 2021 in European Patent Application No. 21157801.8, 8 pages.
(Continued)

*Primary Examiner* — Benjamin C Lee
*Assistant Examiner* — Emily J Frank
(74) *Attorney, Agent, or Firm* — Oblon, McClelland, Maier & Neustadt, L.L.P.

(57) ABSTRACT

Aspects of the disclosure relate to an electronic device, a method and an apparatus for measuring color temperature of ambient light, and a storage medium. The electronic device can include a display screen, a first color temperature sensor and a second color temperature sensor that are arranged side by side under the display screen, and a filter element that is located between the second color temperature sensor and the display screen to filter ambient light incident on the second color temperature sensor. The device can further include a processing element that is connected with the first color temperature sensor and the second color temperature sensor respectively to determine ambient light color temperature of an environment where the electronic device is located according to a first color temperature signal value detected by the first color temperature sensor and a second color temperature signal value detected by the second color temperature sensor.

19 Claims, 3 Drawing Sheets

(51) Int. Cl.
  *G01J 5/59* (2022.01)
  *G02B 5/30* (2006.01)
  *G09G 3/20* (2006.01)
  *G09G 3/3208* (2016.01)

(52) U.S. Cl.
  CPC ...... *G09G 3/2003* (2013.01); *G01J 2005/608* (2013.01); *G09G 3/3208* (2013.01); *G09G 2320/0666* (2013.01); *G09G 2360/144* (2013.01); *G09G 2360/16* (2013.01)

(56) References Cited

U.S. PATENT DOCUMENTS

| | | | | |
|---|---|---|---|---|
| 2012/0182420 A1* | 7/2012 | Grokop | ............... | H04W 4/50 348/143 |
| 2014/0132578 A1* | 5/2014 | Zheng | ............... | G01J 1/4228 345/207 |
| 2014/0152632 A1* | 6/2014 | Shedletsky | ............ | H04N 5/58 250/208.2 |
| 2016/0232828 A1 | 8/2016 | Jia et al. | | |
| 2016/0370231 A1 | 12/2016 | Agahian et al. | | |
| 2018/0266878 A1 | 9/2018 | Jacobs et al. | | |
| 2019/0137670 A1* | 5/2019 | Nagaya | ............... | H01L 31/0232 |
| 2020/0056936 A1* | 2/2020 | Lin | ............... | G01J 1/4204 |
| 2020/0105183 A1* | 4/2020 | Dodson | ............ | G02B 27/281 |
| 2021/0256932 A1* | 8/2021 | Min, II | ............... | G01J 5/60 |

FOREIGN PATENT DOCUMENTS

| | | |
|---|---|---|
| CN | 109471491 A | 3/2019 |
| CN | 107909922 B | 10/2019 |
| CN | 110675839 A | 1/2020 |
| WO | WO 2019/037723 A1 | 2/2019 |

OTHER PUBLICATIONS

Combined Chinese Office Action and Search Report issued Jul. 27, 2023, in corresponding Chinese Patent Application No. 202010575901.9 (with English Translation and English Translation of Category of Cited Documents), 15 pages.

* cited by examiner

ELECTRONIC DEVICE, METHOD AND APPARATUS FOR MEASURING COLOR TEMPERATURE OF AMBIENT LIGHT, AND STORAGE MEDIUM

CROSS-REFERENCE TO RELATED APPLICATION

The present application is based on and claims the priority to the Chinese Patent Application No. 202010575901.9, filed on Jun. 22, 2020, the entire contents of which are hereby incorporated by reference.

TECHNICAL FIELD

The present disclosure relates to the technical field of electronic device, including to an electronic device, a method and an apparatus for measuring color temperature of ambient light, and a storage medium.

BACKGROUND

The electronic device is usually provided with a color temperature sensor, and the color temperature sensor may be used to detect color temperature of ambient light, so that the electronic device may be optimized according to the detected ambient color temperature. For example, on one hand, the electronic device may automatically adjust the color temperature of the screen according to the ambient color temperature to meet visual needs of the user. On the other hand, when a picture is taken, the electronic device may turn on the flash according to the color temperature of the ambient light, so that the color temperature of the flash is consistent with the color temperature of the ambient light, so that the color temperature of the captured image is consistent with the color temperature of the ambient light. However, in the full screen scheme, the color temperature sensor is placed below the display screen, and the display light of the display screen will affect the detection of the ambient light color temperature by the color temperature sensor.

SUMMARY

The present disclosure provides an electronic device, a method and an apparatus for measuring color temperature of ambient light, and a storage medium.

According to a first aspect of the present disclosure, there is provided an electronic device. The electronic device can include a display screen, and a first color temperature sensor and a second color temperature sensor that are arranged side by side under the display screen. The electronic device can further include a filter element, located between the second color temperature sensor and the display screen, to filter ambient light incident on the second color temperature sensor, and a processing element, connected with the first color temperature sensor and the second color temperature sensor respectively, to determine ambient light color temperature of an environment where the electronic device is located according to a first color temperature signal value detected by the first color temperature sensor and a second color temperature signal value detected by the second color temperature sensor.

According to a second aspect of the present disclosure, there is provided a method for measuring color temperature of ambient light that is applied to an electronic device including a display screen. The method can include acquiring a first color temperature signal value detected by a first color temperature sensor, wherein the first color temperature signal value is formed by display light of the display screen acting on the first color temperature sensor alone after ambient light is filtered by a filter element, acquiring a second color temperature signal value detected by a second color temperature sensor, wherein the second color temperature signal value is formed by the ambient light and the display light jointly acting on the second color temperature sensor, and determining the color temperature of the ambient light according to the first color temperature signal value and the second color temperature signal value.

According to a third aspect of the present disclosure, there is provided an apparatus for measuring color temperature of ambient light. The apparatus can include a first acquiring module that is configured to acquire a first color temperature signal value detected by a first color temperature sensor, wherein the first color temperature signal value is formed by display light of the display screen acting on the first color temperature sensor alone after ambient light is filtered by a filter element. Additionally, the apparatus can include a second acquiring module that is configured to acquire a second color temperature signal value detected by a second color temperature sensor, wherein the second color temperature signal value is formed by the ambient light and the display light jointly acting on the second color temperature sensor. Further, the device can include a first determining module that is configured to determine the color temperature of the ambient light according to the first color temperature signal value and the second color temperature signal value.

According to a fourth aspect of the present disclosure, there is provided an apparatus for measuring color temperature of ambient light, including a processor and a memory for storing instructions executable by the processor. The processor is configured to execute the method for measuring color temperature of ambient light according to the above second aspect.

According to a fifth aspect of the present disclosure, there is provided a non-transitory storage medium, wherein instructions in the storage medium, when executed by the processor of the computer, cause the computer to execute the method for measuring color temperature of ambient light according to the above second aspect.

It should be noted that the above general description and the following detailed description are merely exemplary and explanatory, and should not be construed as limiting of the present disclosure.

BRIEF DESCRIPTION OF THE DRAWINGS

The drawings herein are incorporated into and constitute a part of this specification, show exemplary embodiments consistent with this disclosure, and are used to explain the principles of this disclosure together with the specification.

DETAILED DESCRIPTION

The exemplary embodiments will be described in detail herein, and examples thereof are shown in the accompanying drawings. When the following description refers to the accompanying drawings, unless otherwise indicated, the same numbers in different drawings represent the same or similar elements. The implementations described in the following exemplary embodiments do not represent all implementations consistent with the present disclosure. Rather, they are only examples of apparatuses and methods consistent with some aspects of the present disclosure as detailed in the appended claims.

Figure 1:
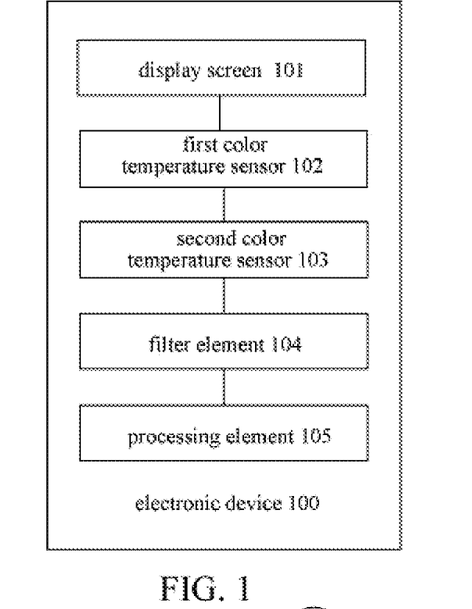
FIGS. 1 to 2 are schematic diagrams showing a structure of an electronic device according to an embodiment of the present disclosure.
Figure 2:
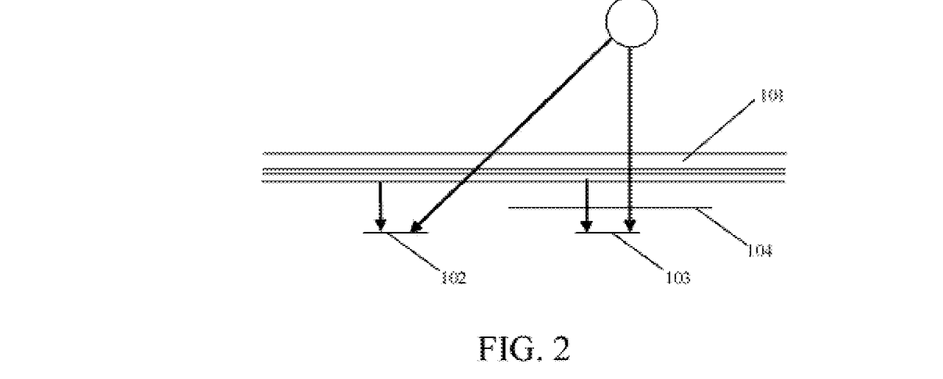

FIGS. 1 to 2 are schematic diagrams showing a structure of an electronic device according to an embodiment of the present disclosure. As shown in FIGS. 1 and 2, the electronic device 100 includes a display screen 101, and a first color temperature sensor 102 and a second color temperature sensor 103, arranged side by side under the display screen 101. The device 100 can also include a filter element 104, located between the second color temperature sensor 103 and the display screen 101, to filter ambient light incident on the second color temperature sensor 103, and a processing element 105, connected with the first color temperature sensor 102 and the second color temperature sensor 103 respectively, to determine ambient light color temperature of an environment where the electronic device 100 is located according to a first color temperature signal value detected by the first color temperature sensor 102 and a second color temperature signal value detected by the second color temperature sensor 103. In the embodiment of the present disclosure, the electronic device 100 may be a mobile phone, a tablet computer, or the like.

The electronic device 100 includes a display screen 101 for displaying images, and the display screen 101 may be a display screen made of an organic light-emitting diode (OLED). It should be noted that the display screen 101 may also be a touch screen with a touch function.

The electronic device 100 includes a first color temperature sensor 102 and a second color temperature sensor 103, and the two color temperature sensors are arranged side by side under the display screen 101. It should be noted that the first color temperature sensor 102 and the second color temperature sensor 103 arranged side by side do not overlap each other, so as to reduce interference on reception of ambient light or display light due to overlapping, thereby affecting the detection of color temperature. In addition, the first color temperature sensor 102 and the second color temperature sensor 103 may be arranged side by side in a length direction of the electronic device 100, so that the electronic device 100 may be lighter and thinner.

In the embodiment of the present disclosure, the electronic device 100 further includes a filter element 104 located between the second color temperature sensor 103 and the display screen 101, to filter ambient light incident on the second color temperature sensor 103. The filter element 104 may be a polarizer, and a polarization direction of the polarizer may make the ambient light not incident on the second color temperature sensor 103.

It should be noted that in the embodiment of the present disclosure, the second color temperature sensor 103 filters out the ambient light through the filter element 104, but the filter element 104 will not filter out the display light of the display screen 101, and the second color temperature sensor 103 may still receive the display light of the display screen 101, and thus the color temperature signal value acted by the display light may be detected.

In addition, the first color temperature sensor 102 is located below the display screen 101, and there is no filter element above the first color temperature sensor 102, so the first color temperature sensor 102 may receive the ambient light of the environment where the electronic device 100 is located and the display light of the display screen 101. Therefore, the first color temperature sensor 102 may detect the color temperature signal value jointly acted by the ambient light and the display light.

In the embodiment of the present disclosure, the electronic device 100 further includes a processing element 105 electrically connected with the first color temperature sensor 102 and the second color temperature sensor 103 respectively. It may determine ambient light color temperature of an environment where the electronic device 100 is located according to a first color temperature signal value jointly acted by the display light and the ambient light and detected by the first color temperature sensor 102 and a second color temperature signal value acted by the display light and detected by the second color temperature sensor 103.

In this embodiment, the electronic device can determine the value acted by the ambient light alone based on the first color temperature signal value and the second color temperature signal value, and further determine the color temperature of the ambient light. For example, the electronic device obtains a difference between the first color temperature signal value and the second color temperature signal value, and obtains the color temperature of the ambient light according to the difference.

It should be noted that, in the embodiment of the present disclosure, the first color temperature sensor 102 and the second color temperature sensor 103 arranged side by side may be disposed at intervals. However, when contents displayed in different areas on the display screen 101 are different, the displayed content will affect the signal detected by the color temperature sensor. Therefore, in order to reduce the influence of the content displayed on the display screen 101 on the color temperature signal detected by the color temperature sensor, an interval between the first color temperature sensor 102 and the second color temperature sensor 103 may be set to be within a preset range.

It may be understood that, in the embodiments of the present disclosure, a first color temperature sensor and a second color temperature sensor are arranged below a display screen, and a filter element is arranged above the second color temperature sensor to filter the ambient light, so that the electronic device may detect a color temperature signal value acted by the display light alone based on the second color temperature sensor. In addition, the electronic device may also exclude an influence of lightening of the display screen on the ambient color temperature based on the color temperature signal value jointed acted by the ambient light and the display light and detected by the first color temperature sensor. In this way, the full-screen electronic device may obtain more accurate ambient light color temperature, thereby providing users with better usage experience.

In an embodiment, each of the display screen 101 and the filter element 104 includes a polarizer, the polarizer in the display screen 101 has a first polarization direction, and the polarizer in the filter element 104 has a second polarization direction, and the first polarization direction is orthogonal to the second polarization direction.

In this embodiment, each of the display screen 101 and the filter element 104 includes a polarizer. The polarizer can control a polarization direction of a specific beam. When natural light passes through the polarizer, the light whose vibration direction is perpendicular to the transmission axis of the polarizer will be absorbed, and only the polarized light whose vibration direction is parallel to the transmission axis of the polarizer is transmitted.

When the ambient light is incident on the display screen 101, the ambient light can be controlled to be transmitted in the first polarization direction through the polarizer in the display screen 101; while since the second polarization direction of the polarizer in the filter element 104 is orthogonal (perpendicular) to the first polarization direction, when the ambient light transmitted inward through the display screen 101 is transmitted to the filter element 104, the ambient light cannot be transmitted to the second color temperature sensor 103.

It should be noted that the polarizer in the display screen 101 faces a direction of a display surface of the display screen 101. For example, taking an OLED display screen as an example, the polarizer is located above the OLED. The polarizer in the display screen 101 is used to assist the display of the display screen. It may be understood that, in the present disclosure, the filtering of the ambient light incident on the second color temperature sensor 103 is implemented through the polarizers with orthogonal polarization directions.

In this embodiment, the polarizers in the display screen 101 and the filter element 104 may both be linear polarizers, and the polarization directions of the two linear polarizers are orthogonal. Taking the display screen 101 as an OLED display screen as an example, the display screen 101 may also include a 1/4λ wave plate in addition to the linear polarizer. The 1/4λ wave plate can face the direction of the polarizer in the display screen 101. For example, the 1/4λ wave plate may be located between the OLED and the polarizer in the display screen.

Figure 3:
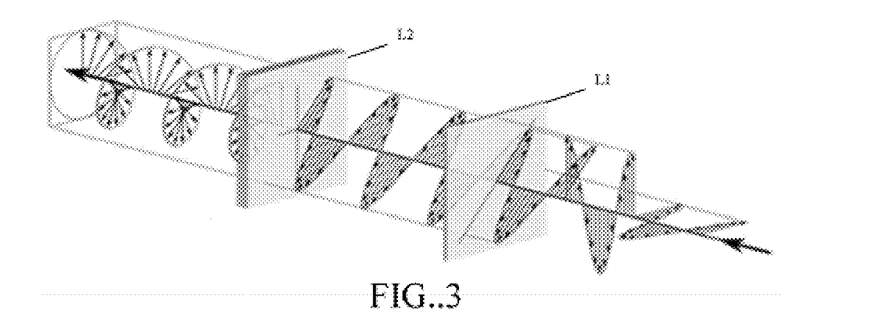
FIG. 3 is an exemplary diagram of optical path transmission in a display screen according to an exemplary embodiment of the present disclosure.

FIG. 3 is an exemplary diagram of optical path transmission in a display screen according to an exemplary embodiment of the present disclosure. As shown in FIG. 3, after ambient light (non-polarized light) is incident on the linear polarizer L1 in the display screen 101, it becomes linearly polarized light. After the linearly polarized light passes through the 1/4λ wave plate L2, it becomes left-handed circularly polarized light. After the left-handed circularly polarized light is reflected by the metal in the OLED display, it can no longer pass through the linear polarizer L1, which can alleviate the problem of reflection of the OLED display screen (for example, the image of the user is on the display screen).

In an embodiment, the polarizer in the filter element 104 is covered on the second color temperature sensor 103. In this embodiment, the polarizer in the filter element 104 is covered on the second color temperature sensor 103, so the ambient light incident on the second color temperature sensor 103 can be filtered out as much as possible through the filter element 104 covering the second color temperature sensor 103.

In an embodiment, the polarizer in the filter element 104 may also be wrapped above the second color temperature sensor 103, so that ambient light incident on the second color temperature sensor 103 can be filtered out in any direction.

When the polarizer in the filter element 104 is wrapped above the second color temperature sensor 103, the first color temperature sensor 102 and the second color temperature sensor 103 can also be arranged adjacently.

In an embodiment, the first color temperature sensor 102 and the second color temperature sensor 103 are multi-spectral color temperature sensors.

The processing element 105 is configured to determine the ambient light color temperature of the environment where the electronic device 100 is located according to the first color temperature signal value in a preset spectral segment detected by the first color temperature sensor 102 and the second color temperature signal value in a preset spectral segment detected by the second color temperature sensor 103. The preset spectral segment contains at least two different wavelengths of light.

In this embodiment, the first color temperature sensor 102 and the second color temperature sensor 103 are both multi-spectral color temperature sensors, and the incident light can be decomposed according to preset spectral segments. The preset spectral segment includes at least two different wavelengths of light. The preset spectrum segment may include the spectrum segment to which visible light belongs, such as red light, blue light, green light, white light, black light, or the like. Therefore, the first color temperature sensor 102 and the second color temperature sensor 103 can detect color temperature signals in different channels.

Based on the first color temperature signal values of different color channels detected by the first color temperature sensor 102 and the second color temperature signal values of different color channels detected by the second color temperature sensor 103, the processing element 105 can determine the ambient light color temperature of the environment where the electronic device 100 is located.

It can be understood that, in this embodiment, the color temperature of the ambient light is determined by obtaining multi-channel color temperature signals detected by the multi-spectral color temperature sensor, which can improve the accuracy of determining the color temperature of the ambient light.

Figure 4:
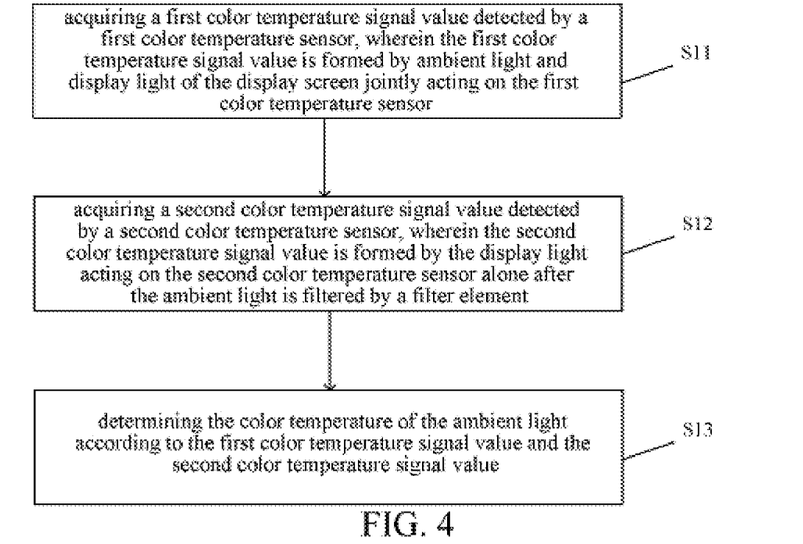
FIG. 4 is a flowchart of a method for measuring color temperature of ambient light according to an embodiment of the present disclosure.

FIG. 4 is a flowchart of a method for measuring color temperature of ambient light according to an embodiment of the present disclosure. As shown in FIG. 4, it is applied to an electronic device including a display screen. The method includes following steps.

In step S11, acquiring a first color temperature signal value detected by a first color temperature sensor, wherein the first color temperature signal value is formed by display light of the display screen acting on the first color temperature sensor alone after ambient light is filtered by a filter element.

In step S12, acquiring a second color temperature signal value detected by a second color temperature sensor, wherein the second color temperature signal value is formed by the ambient light and the display light jointly acting on the second color temperature sensor.

In step S13, determining the color temperature of the ambient light according to the first color temperature signal value and the second color temperature signal value.

In the embodiment of the present disclosure, the electronic device may be the electronic device shown in FIG. 1. The electronic device includes a display screen, a first color temperature sensor, a second color temperature sensor and a filter element. The filter element can filter the ambient light incident on the second color temperature sensor.

The electronic device can obtain the first color temperature signal value jointly acted by the ambient light and the display light of the display screen and detected by the first color temperature sensor, and can also obtain the second color temperature signal value acted by the display light alone and detected by the second color temperature sensor. Therefore, the influence of the display light on the ambient color temperature can be excluded according to the first color temperature signal value and the second color temperature signal value, so that more accurate color temperature of the ambient light can be obtained and better usage experience can be provided to the user.

In this embodiment, the electronic device can determine the value acted by the ambient light alone based on the first color temperature signal value and the second color temperature signal value, and further determine the color temperature of the ambient light. For example, the electronic device obtains a difference between the first color temperature signal value and the second color temperature signal value, and obtains the color temperature of the ambient light according to the difference.

In an embodiment, the first color temperature sensor and the second color temperature sensor are multi-spectral color temperature sensors, each of the first color temperature signal value and the second color temperature signal value includes a color temperature signal value in a preset spectral segment, and the preset spectral segment contains at least two different wavelengths of light. The determining the color temperature of the ambient light according to the first color temperature signal value and the second color temperature signal value can include determining the color temperature of the ambient light according to the first color temperature signal value and the second color temperature signal value in the preset spectral segment.

In this embodiment, the first color temperature sensor and the second color temperature sensor are both multi-spectral color temperature sensors, and the incident light can be decomposed according to preset spectral segments. The preset spectral segment includes at least two different wavelengths of light. The preset spectrum segment may include the spectrum segment to which visible light belongs, such as red light, blue light, green light, white light, or black light, or the like. Therefore, the first color temperature sensor and the second color temperature sensor can detect color temperature signals in different channels.

Therefore, the electronic device can obtain a multi-channel color temperature signal through a multi-spectral color temperature sensor, and determine the color temperature of the ambient light according to the multi-channel color temperature signal, so as to improve the accuracy of determining the color temperature of the ambient light.

In an embodiment, when the color temperature of the ambient light is determined based on the first color temperature signal value and the second color temperature signal value in the preset spectral segment, a matrix algorithm may be used. For example, the value acted by the ambient light is determined according to the first color temperature signal value and the second color temperature signal value of the preset spectral segment, and the value acted by the ambient light is processed by using the processing matrix, to obtain the color temperature of the ambient light.

For example, the color temperature signals of different channels corresponding to the preset spectral segments include the color temperature signals of channels in red (R), green (G), blue (B), black (C), and white (W) or the like.

The steps of the matrix algorithm are as follows:

$$\begin{bmatrix} C_{11} & C_{12} & C_{13} & C_{14} & C_{15} \\ C_{21} & C_{22} & C_{23} & C_{24} & C_{25} \\ C_{31} & C_{32} & C_{33} & C_{34} & C_{35} \end{bmatrix} * \begin{bmatrix} C \\ R \\ G \\ B \\ W \end{bmatrix} = \begin{bmatrix} X \\ Y \\ Z \end{bmatrix} \quad (1)$$

where, the matrix composed of $C_{11}$ to $C_{35}$ is the processing matrix; C, R, G, B and W can be the value acted by the ambient light determined based on the first color temperature signal value and the second color temperature signal value; the obtained X. Y and Z are tristimulus values.

Based on the obtained tristimulus values, the corresponding values under the x and y color coordinates can be obtained according to the following formula (2):

$$x = \frac{X}{X+Y+Z} \quad (2)$$
$$y = \frac{Y}{X+Y+Z}$$

Based on the obtained corresponding values under the x and y color coordinates, the ambient color temperature T is calculated by polynomial calculation. At this time, T=F (x, y). In a possible implementation, the ambient light color temperature T can be obtained by the following formula (3):

$$T = -449 * \left(\frac{x-0.332}{y-0.1858}\right)^3 + \quad (3)$$
$$3525 * \left(\frac{x-0.332}{y-0.1858}\right)^2 - 6823.3\left(\frac{x-0.332}{y-0.1858}\right)^1 + 5520.33$$

In an embodiment, the color temperature signal value in the preset spectral segment includes a component acted by infrared light, and the method can further include removing the component acted by the infrared light in the first color temperature signal value and the second color temperature signal value in the preset spectral segment. Additionally, the method can include that the determining the color temperature of the ambient light according to the first color temperature signal value and the second color temperature signal value in the preset spectral segment includes determining the color temperature of the ambient light according to the first color temperature signal value and the second color temperature signal value in the preset spectral segment after removing the component acted by the infrared light.

In this embodiment, since the polarizer cannot filter infrared components, infrared components in ambient light and/or display light may pass through the polarizer and be incident on the color temperature sensor. Therefore, the color temperature signal value in the preset spectral segment may include the component acted by the infrared light, and the component acted by the infrared light needs to be removed.

In this regard, in the present disclosure, the component acted by the infrared light is removed from the first color temperature signal value and the second color temperature signal value in the preset spectral segment, and the color temperature of the ambient light is determined according to the first color temperature signal value and the second color temperature signal value in the preset spectral segment after removing the component acted by the infrared light. Thus, more accurate color temperature of the ambient light may be obtained.

The component acted by the infrared light can be given by the following formula (4):

$$IR=(R+G+B-C)/2 \qquad (4)$$

By subtracting the component acted by the infrared light on the basis of the color temperature signal values of different channels detected by the sensor, the color temperature signal value after removing the component acted by the infrared light is obtained, seeing the following formula (5):

$$C_{cm}=C_m-IR \qquad (5)$$

where $C_m$, may represent the color temperature signal value of each channel detected by the color temperature sensor; IR is the infrared light value; and $C_{cm}$ is the color temperature signal value after removing the component acted by the infrared light.

It should be noted that, the component acted by the infrared light needs to be subtracted from the color temperature signal values of each channel detected by the first color temperature sensor and the second color temperature sensor. Moreover, in the manner of obtaining the color temperature of ambient light by using the above matrix algorithm (1)-(3), C, R, G, B and W in formula (1) can all be the values acted by the ambient light determined based on the first color temperature signal value and the second color temperature signal value after subtracting the component acted by the infrared light.

In an embodiment, when the color temperature of the ambient light is determined based on the first color temperature signal value and the second color temperature signal value in the preset spectral segment, a linear algorithm may be used, as shown in the following formula (6):

$$T=\text{Coeffi.}*(B'/R')+\text{offset} \qquad (6)$$

where B'=B−IR, R'=R−IR; Coeffi. and offset are given by calibration; T is the color temperature of the ambient light.

It should be noted that, in the embodiments of the present disclosure, B' and R' can be understood as the values acted by the ambient light and determined based on the first color temperature signal value and the second color temperature signal value after removing the component acted by the infrared light.

In an embodiment, the determining the color temperature of the ambient light according to the first color temperature signal value and the second color temperature signal value in the preset spectral segment after removing the component acted by the infrared light further includes determining an action value of the display light on the multi-spectral first color temperature sensor according to the second color temperature signal value in the preset spectral segment after removing the component acted by the infrared light, subtracting the action value of the display light on the multi-spectral first color temperature sensor from the first color temperature signal value in the preset spectral segment after removing the component acted by the infrared light, to obtain an action value of the ambient light in the preset spectral segment, and determining the color temperature of the ambient light according to the action value of the ambient light in the preset spectral segment.

In this embodiment, the second color temperature signal value is formed by the display light of the display screen acting on the second color temperature sensor after the action of the filter element. The filter element will affect the reception of the display light by the second color temperature sensor, so the value acted by the display light and detected by the second color temperature sensor is the value subject to processing by the filter element. The first color temperature signal value is formed by the display light and the ambient light jointly acting on the first color temperature sensor without the action of the filter element.

Therefore, in this embodiment, in order to accurately determine the color temperature of the external ambient light, it is necessary to determine the action value of the display light on the multi-spectral first color temperature sensor. The action value of the ambient light can be obtained by subtracting the action value of the display light on the first color temperature sensor from the first color temperature signal value jointly acting by the ambient light and the display light and detected by the first color temperature sensor.

In this embodiment, the action value of the display light on the multi-spectral first color temperature sensor can be determined by the second color temperature signal value detected by the multi-spectral second color temperature sensor.

It should be noted that, as mentioned above, since the infrared light will affect the value of each channel, it is necessary to determine the action value of the display light on the multi-spectral first color temperature sensor based on the second color temperature signal value in the preset spectral segment after removing the component acted by the infrared light. By respectively subtracting the action value of the display light on the multi-spectral first color temperature sensor from the first color temperature signal value in the preset spectral segment after removing the component acted by the infrared light, the action value of ambient light in the preset spectral segment is obtained. When the color temperature of the ambient light is determined according to the action value of the ambient light in the preset spectral segment, the color temperature of the ambient light can be calculated according to the linear algorithm and the matrix algorithm described above.

Taking that the first color temperature signal value after removing the component acted by the infrared light according to formula (5) is $S_C$ and the second color temperature signal value after removing the component acted by the infrared light according to formula (5) is $S_P$ as an example, the action vale $K*S_P$ of the display light on the first color temperature sensor may be obtained based on the attenuation coefficient K (the influence factor of the filter element on the display light) of the display light under the action of the filter element determined in advance, and then the action value $S_A$ of the ambient light can be expressed by the following formula (7):

$$S_A=S_C-K*S_P \qquad (7)$$

where the attenuation coefficient K of the display light under the action of the filter element can be obtained in advance in the experimental environment.

As for the data of different channels in the preset spectral segment, such as channels C, R, G, B and W, the action value of each channel corresponding to the ambient light can be expressed by the following formula (8):

$$A_r=C_r-K_r*P_r$$

$$A_g=C_g-K_g*P_g$$

$$A_b=C_b-K_b*P_b$$

$$A_c=C_c-K_c*P_c$$

$$A_w=C_w-K_w*P_w \qquad (8)$$

where $A_r$ corresponds to the channel R; $A_g$ corresponds to the channel G; $A_b$ corresponds to the channel B; $A_c$ corresponds to the channel C; $A_w$ corresponds to the channel W.

Taking the matrix algorithm as an example, values of $A_r$ to $A_c$ correspond to values of R to W in formula (1).

In an embodiment, the method further includes determining an influence factor of the filter element on the light of different wavelengths contained in the display light according to color temperature signal values respectively detected by the first color temperature sensor and the second color temperature sensor in corresponding spectral segments under preset dark light conditions. Further, the determining an action value of the display light on the multi-spectral first color temperature sensor according to the first color temperature signal value in the preset spectral segment after removing the component acted by the infrared light can further include determining an action value of display light on the multi-spectral first color temperature sensor according to the first color temperature signal value in the preset spectral segment after removing the component acted by the infrared light and the influence factor of the filter element on the light of different wavelengths contained in the display light.

In this embodiment, under the preset dark light condition, the influence of ambient light can be excluded to a certain extent. Therefore, under the preset dark light condition, the values detected by the first color temperature sensor and the second color temperature sensor are all the values acted by the display light of the display screen. The difference is that the value acted by the display light detected by the second color temperature sensor is a value affected by the filter element, and the value acted by the display light detected by the first color temperature sensor is a value not affected by the filter element.

Therefore, under the preset dark light condition, the influence factor of the filter element on the light of different wavelengths contained in the display light can be determined according to the color temperature signal values respectively detected by the first color temperature sensor and the second color temperature sensor in the corresponding spectral segment.

In the embodiment of the present disclosure, the influence factor can be expressed by a ratio between the color temperature signal values acted by the display light detected by the first color temperature sensor and the second color temperature sensor, as shown in the following formula (9):

$$K_m = \frac{C_m}{P_m} \quad (9)$$

where $K_m$ is the influence factor (attenuation coefficient K), $C_m$ may represent the color temperature signal of a certain spectral segment detected by the first color temperature sensor; $P_m$ may represent the color temperature signal detected by the second color temperature sensor in the same spectral segment as the first color temperature sensor.

Still taking channels C, R, G, B and W as an example, $K_r$, $K_g$, $K_b$, $K_c$ and $K_w$ in the above formula (8) are the influence factors of the filter elements on the light of different wavelengths (different channels) contained in the display light.

Based on the influence factor determined under the preset dark light condition, the action value of the display light on the multi-spectral first color temperature sensor may be determined according to the first color temperature signal value in the preset spectral segment after removing the component acted by the infrared light and the influence factor of the filter element on the light of different wavelengths contained in the display light, that is, values of $K_r*P_r$, $K_g*P_g$ in the above formula (8) may be determined.

In an embodiment, the method further includes controlling the display screen to respectively display images of colors corresponding to the spectral segments under the preset dark light conditions, and acquiring a first signal value detected by the first color temperature sensor and a second signal value detected by the second color temperature sensor when the display screen displays an image of a color corresponding to the spectral segment. Further, the determining an influence factor of the filter element on the light of different wavelengths contained in the display light according to color temperature signal values respectively detected by the first color temperature sensor and the second color temperature sensor in corresponding spectral segments under preset dark light conditions can include determining the influence factor of the filter element on the light of different wavelengths contained in the display light according to the first signal value and the second signal value when the display screen displays images of different colors.

In this embodiment, in order to obtain the influence factors of the filter element on the light of different wavelengths (that is, different channels) contained in the display screen under the preset dark light condition, images of different color channels can be displayed on the display screen. For example, the display screen is controlled to display images in red, green, blue, black, and white respectively.

Based on the image of the corresponding color displayed on the display screen, the electronic device can obtain the first signal value detected by the first color temperature sensor and the second signal value detected by the second color temperature sensor, and determine the influence factor of the filter element on the light of the wavelength corresponding to the color contained in the display light according to the first signal value and the second signal value.

It may be understood that by controlling the display screen to display images of different colors under preset dark light conditions, it is convenient to determine the influence factors of the filter element on the light of different wavelengths contained in the display light.

In an embodiment, the acquiring a first signal value detected by the first color temperature sensor and a second signal value detected by the second color temperature sensor when the display screen displays an image of a color corresponding to the spectral segment includes acquiring the first signal value detected by the first color temperature sensor and the second signal value detected by the second color temperature sensor respectively when the display screen displays images of colors corresponding to the spectral segments with different types of light sources. Further, the determining the influence factor of the filter element on the light of different wavelengths contained in the display light according to the first signal value and the second signal value when the display screen displays images of different colors can include determining an average value of ratios of the first signal values and the second signal values, when the display screen displays the image of the corresponding color of the spectral segment with different types of light sources, and determining the average value of the ratios in the preset spectral segment as the influence factor of the filter element on the light of different wavelengths contained in the display light.

In this embodiment, in order to more accurately determine the influence factors of the filter element on the light of different wavelengths contained in the display light, the display screen can be made to display images of corresponding colors with different types of light sources, and the ratio between the first signal value detected by the first color temperature sensor and the second signal value detected by the second color temperature sensor may be obtained when the corresponding types of light sources are displayed.

Further, the electronic device determines the average value of the ratios of the first signal value and the second signal value when the display screen displays the image of the corresponding color of the spectral segment with different types of light sources, and determines the average value of the ratios in the preset spectral segment (different channels) as the influence factor of the filter element on the light of different wavelengths contained in the display light.

Table 1 is a data table of the ratios between the signal values detected by the first color temperature sensor and the second color temperature sensor when a display screen displays corresponding color images with different types of light sources according to an exemplary embodiment of the present disclosure.

Based on the ratios obtained by each channel under different light source types, the average value of the ratios under different light source types corresponding to the same channel can be calculated to obtain the influence factors $K_c$, $K_r$, $K_g$, $K_b$ and $K_w$.

It may be understood that, in this embodiment, by taking the average value of the ratios between the signal values detected by the corresponding channels under different light source types as the influencing factor under the corresponding channels, it can reduce the difference of ambient light color temperature detection caused by different light source types, which can enhance the universality of the disclosed method.

Figure 5:
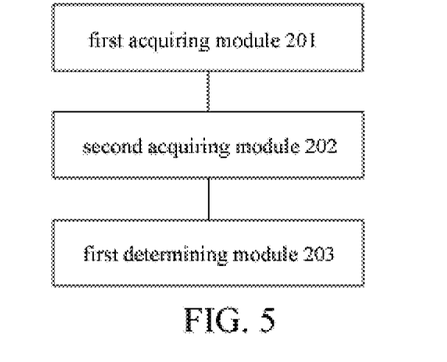
FIG. 5 is a diagram showing an apparatus for measuring color temperature of ambient light according to an exemplary embodiment.

FIG. 5 is a diagram showing an apparatus for measuring color temperature of ambient light according to an exemplary embodiment. Of course, it should be understood that the one or more modules described in this disclosure can be implemented by circuitry.

Referring to FIG. 5, the apparatus for measuring color temperature of ambient light is applied to electronic device including a display screen The apparatus can include a first acquiring module 201 that is configured to acquire a first color temperature signal value detected by a first color temperature sensor, wherein the first color temperature signal value is formed by display light of the display screen acting on the first color temperature sensor alone after

TABLE 1

| serial number | type of light source | light intensity | magnification factors | integral time | Kc | Kr | Kg | Kb | Kw |
|---|---|---|---|---|---|---|---|---|---|
| 564 | H-W | 1370 | 64 | 99999 | 2.633188 | 2.618462 | 2.720183 | 2.73 | 2.56391 |
| 564 | D65-W | 1853 | 64 | 99999 | 2.474012 | 2.386315 | 2.448811 | 2.416759 | 2.210219 |
| 564 | U30-R | 72 | 512 | 99999 | 2.500944 | 2.449802 | 2.529131 | 2.500846 | 2.373753 |
| 564 | U30-G | 216 | 512 | 99999 | 2.466757 | 2.40364 | 2.492396 | 2.483529 | 2.345987 |
| 564 | U30-B | 535 | 256 | 99999 | 2.393276 | 2.323362 | 2.421384 | 2.425698 | 2.293281 |
| 564 | U30-W | 1076 | 128 | 99999 | 2.451722 | 2.412671 | 2.483482 | 2.457239 | 2.332938 |
| 564 | CWF-R | 77 | 512 | 99999 | 2.497194 | 2.448732 | 2.520964 | 2.494131 | 2.366008 |
| 564 | CWF-G | 188 | 512 | 99999 | 2.475162 | 2.424134 | 2.490042 | 2.480984 | 2.352988 |
| 564 | CWF-B | 466 | 512 | 99999 | 2.406601 | 2.353698 | 2.421357 | 2.441653 | 2.308789 |
| 564 | CWF-W | 949 | 256 | 99999 | 2.365055 | 2.320856 | 2.385983 | 2.410285 | 2.28357 |
| 564 | D50-R | 70 | 512 | 99999 | 2.533934 | 2.487308 | 2.561551 | 2.527405 | 2.394383 |
| 564 | D50-G | 321 | 512 | 99999 | 2.469051 | 2.403749 | 2.496815 | 2.477376 | 2.339457 |
| 564 | D50-B | 749 | 256 | 99999 | 2.384092 | 2.3194 | 2.428797 | 2.416107 | 2.288317 |
| 564 | D50-W | 1639 | 64 | 99999 | 2.477996 | 2.464387 | 2.532705 | 2.496359 | 2.392079 |

As shown in Table 1, when the display screen displays with different light source types, the light intensity is different, and the corresponding processing magnification factors and integration time in the color temperature sensor may also be different. Correspondingly, under different light source types, the ratios under different channels are Kc, Kr, Kg, Kb and Kw respectively. In the embodiment, Kc represents the ratio between the signal values detected by the first color temperature sensor and the second color temperature sensor when the display screen displays a black image; Kr represents the ratio between the signal values detected by the first color temperature sensor and the second color temperature sensor when the display screen displays a red image; Kg represents the ratio between the signal values detected by the first color temperature sensor and the second color temperature sensor when the display screen displays a green image; Kb represents the ratio between the signal values detected by the first color temperature sensor and the second color temperature sensor when the display screen displays a blue image; and Kw represents the ratio between the signal values detected by the first color temperature sensor and the second color temperature sensor when the display screen displays a white image.

ambient light is filtered by a filter element. The apparatus can further include a second acquiring module 202 that is configured to acquire a second color temperature signal value detected by a second color temperature sensor. The second color temperature signal value is formed by the ambient light and the display light jointly acting on the second color temperature sensor. Additionally, the apparatus can include a first determining module 203 that is configured to determine the color temperature of the ambient light according to the first color temperature signal value and the second color temperature signal value.

Optionally, the first color temperature sensor and the second color temperature sensor are multi-spectral color temperature sensors, each of the first color temperature signal value and the second color temperature signal value includes a color temperature signal value in a preset spectral segment, and the preset spectral segment contains at least two different wavelengths of light. Further, the first determining module 203 can be configured to determine the color temperature of the ambient light according to the first color temperature signal value and the second color temperature signal value in the preset spectral segment.

Optionally, the color temperature signal value in the preset spectral segment includes a component acted by infrared light. The apparatus further can further include a removing module 204 that is configured to remove the component acted by the infrared light in the first color temperature signal value and the second color temperature signal value in the preset spectral segment. The first determining module 203 can be configured to determine the color temperature of the ambient light according to the first color temperature signal value and the second color temperature signal value in the preset spectral segment after removing the component acted by the infrared light.

Additionally, the first determining module 203 can be configured to determine an action value of the display light on the multi-spectral first color temperature sensor according to the second color temperature signal value in the preset spectral segment after removing the component acted by the infrared light, subtract the action value of the display light on the multi-spectral first color temperature sensor from the first color temperature signal value in the preset spectral segment after removing the component acted by the infrared light, to obtain an action value of the ambient light in the preset spectral segment, and determine the color temperature of the ambient light according to the action value of the ambient light in the preset spectral segment.

Optionally, the apparatus can further include a second determining module 205, configured to determine an influence factor of the filter element on the light of different wavelengths contained in the display light according to color temperature signal values respectively detected by the first color temperature sensor and the second color temperature sensor in corresponding spectral segments under preset dark light conditions. The first determining module 203 can be configured to determine an action value of display light on the multi-spectral first color temperature sensor according to the first color temperature signal value in the preset spectral segment after removing the component acted by the infrared light and the influence factor of the filter element on the light of different wavelengths contained in the display light.

Additionally, the apparatus further includes a display module 206 that is configured to control the display screen to respectively display images of colors corresponding to the spectral segments under the preset dark light conditions. Further, the apparatus can include a third acquiring module 207 that is configured to acquire a first signal value detected by the first color temperature sensor and a second signal value detected by the second color temperature sensor when the display screen displays an image of a color corresponding to the spectral segment. The second determining module 205 can be configured to determine the influence factor of the filter element on the light of different wavelengths contained in the display light according to the first signal value and the second signal value when the display screen displays images of different colors.

In other embodiments, the third acquiring module 207 can be configured to acquire the first signal value detected by the first color temperature sensor and the second signal value detected by the second color temperature sensor respectively when the display screen displays images of colors corresponding to the spectral segments with different types of light sources. The second determining module 205 can be configured to determine an average value of ratios of the first signal values and the second signal values, when the display screen displays the image of the corresponding color of the spectral segment with different types of light sources, and determine the average value of the ratios in the preset spectral segment as the influence factor of the filter element on the light of different wavelengths contained in the display light.

Regarding the apparatus in the foregoing embodiment, the specific manner in which each module performs the operation has been described in detail in the embodiment of the method, and detailed description will not be given herein.

The technical solutions provided by the embodiments of the present disclosure include beneficial effects. For example, it may be understood that, in the embodiments of the present disclosure, a first color temperature sensor and a second color temperature sensor are arranged below a display screen, and a filter element is arranged above the second color temperature sensor to filter the ambient light, so that the electronic device may detect a color temperature signal value acted by the display light alone based on the second color temperature sensor. In addition, the electronic device may also exclude an influence of lightening of the display screen on the ambient color temperature based on the color temperature signal value jointed acted by the ambient light and the display light and detected by the first color temperature sensor. In this way, the full-screen electronic device may obtain more accurate ambient light color temperature, thereby providing users with better usage experience.

Figure 6:
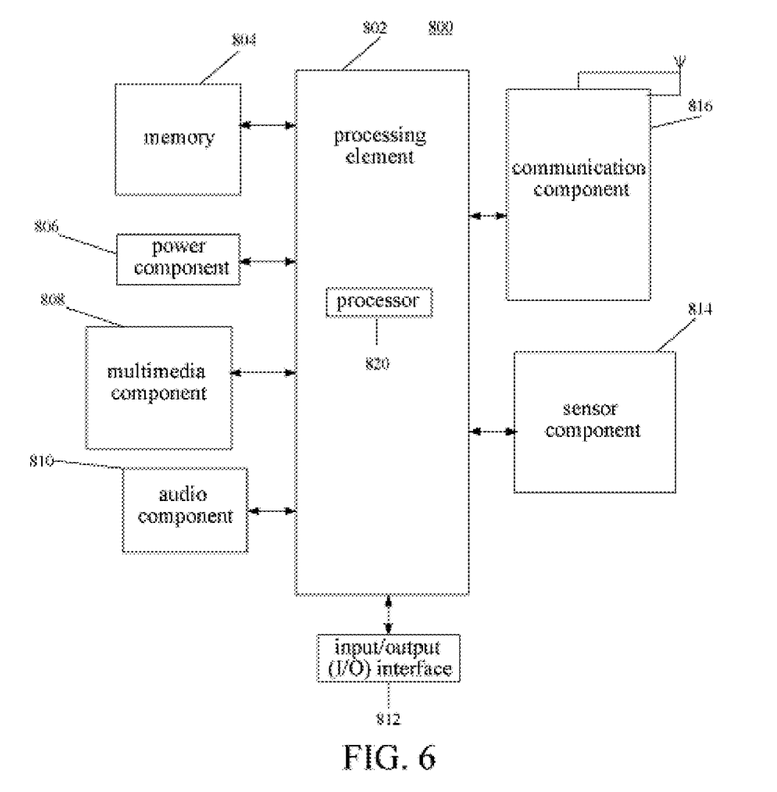
FIG. 6 is a block diagram of an electronic device according to an embodiment of the present disclosure.

FIG. 6 is a block diagram of an electronic device 800 according to an embodiment of the present disclosure. For example, the device 800 may be a mobile phone, a mobile computer, or the like.

Referring to FIG. 6, the device 800 may include one or more of the following components: a processing element 802, a memory 804, a power component 806, a multimedia component 808, an audio component 810, an input/output (I/O) interface 812, a sensor component 814, and a communication component 816.

The processing element 802 typically controls the overall operations of the device 800, such as the operations associated with display, telephone calls, data communications, camera operations, and recording operations. The processing element 802 can include one or more processors 820 to execute instructions to perform all or part of the steps in the above described methods. Moreover, the processing element 802 can include one or more modules to facilitate the interaction between the processing element 802 and other components. For example, the processing element 802 can include a multimedia module to facilitate the interaction between the multimedia component 808 and the processing element 802.

The memory 804 is configured to store various types of data to support the operation of the device 800. Examples of such data include instructions for any application or method operated on the device 800, such as the contact data, the phone book data, messages, pictures, videos, and the like. The memory 804 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 can include a power management system, one or more power sources, and other components associated with the generation, management, and distribution of power in the device 800.

The multimedia component 808 can include a screen providing an output interface between the device 800 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. When the device 800 is in an operation mode, such as a photographing mode or a video mode, the front camera and/or the rear camera can receive external multimedia data. Each of the front camera and the rear camera may be a fixed optical lens system or have focus and optical zoom capability.

The audio component 810 is configured to output and/or input an audio signal. For example, the audio component 810 includes a microphone (MIC) configured to receive an external audio signal when the device 800 is in an operation mode, such as a call mode, a recording mode, and a voice recognition mode. The received audio signal may be further stored in the memory 804 or sent via the communication component 816. In some embodiments, the audio component 810 also includes a speaker for outputting the audio signal.

The I/O interface 812 provides an interface between the processing element 802 and peripheral interface modules, such as a keyboard, a click wheel, buttons, and the like. These buttons may include, but not limited to, a home button, a volume button, a starting button, and a locking button.

The sensor component 814 includes one or more sensors for providing state assessments of various aspects of the device 800. For example, the sensor component 814 can detect an open/closed state of the device 800, relative positioning of components, such as the display and the keypad of the device 800. The sensor component 814 can also detect a change in position of one component of the device 800 or the device 800, the presence or absence of user contact with the device 800, an orientation, or an acceleration/deceleration of the device 800, and a change in temperature of the device 800. The sensor component 814 can also include a proximity sensor configured to detect the presence of nearby objects without any physical contact. The sensor component 814 can also include a light sensor, such as a CMOS or CCD image sensor, configured to use in imaging applications. In some embodiments, the sensor component 814 can also include an accelerometer sensor, a gyroscope sensor, a magnetic sensor, a pressure sensor, or a temperature sensor.

The communication component 816 is configured to facilitate wired or wireless communication between the device 800 and other devices. The device 800 can access a wireless network based on any communication standard, such as Wi-Fi, 2G, 3G or a combination thereof. In an exemplary embodiment, the communication component 816 receives broadcast signals or broadcast associated information from an external broadcast management system via a broadcast channel. In an exemplary embodiment, the communication component 816 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology, and other technologies.

In an exemplary embodiment, the device 800 may be implemented with one or more application specific integrated circuits (ASICs), digital signal processors (DSPs), digital signal processing devices (DSPDs), programmable logic devices (PLDs), field programmable Gate arrays (FPGAs), controllers, microcontrollers, microprocessors or other electronic components, to perform the above methods.

In an exemplary embodiment, there is also provided a non-transitory computer-readable storage medium including instructions, such as a memory 804 including instructions executable by the processor 820 of the device 800 to perform the above methods. For example, the non-transitory computer readable storage medium may be a ROM, a random access memory (RAM), a CD-ROM, a magnetic tape, a floppy disc, and an optical data storage device, or the like.

A non-transitory computer-readable storage medium, when instructions in the storage medium are executed by a processor of an electronic device, enabling the electronic device including the display screen to perform a method for measuring color temperature of ambient light. The method can include acquiring a first color temperature signal value detected by a first color temperature sensor, wherein the first color temperature signal value is formed by display light of the display screen acting on the first color temperature sensor alone after ambient light is filtered by a filter element, acquiring a second color temperature signal value detected by a second color temperature sensor, wherein the second color temperature signal value is formed by the ambient light and the display light jointly acting on the second color temperature sensor, and determining the color temperature of the ambient light according to the first color temperature signal value and the second color temperature signal value.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative only, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. An electronic device, comprising:
   a display screen;
   a first color temperature sensor and a second color temperature sensor that are arranged side by side at intervals under the display screen, wherein an interval between the first color temperature sensor and the second color temperature sensor is set to be within a preset range;
   a filter element that is located between the second color temperature sensor and the display screen to filter ambient light incident on the second color temperature sensor;

a processing element that is coupled with the first color temperature sensor and the second color temperature sensor, respectively, to determine color temperature of ambient light of an environment where the electronic device is located based on a first color temperature signal value detected by the first color temperature sensor and a second color temperature signal value detected by the second color temperature sensor, wherein a matrix algorithm is used to determine the color temperature of the ambient light according to the first color temperature signal value and the second color temperature signal value, steps of the matrix algorithm are as follows:

$$\begin{bmatrix} C_{11} & C_{12} & C_{13} & C_{14} & C_{15} \\ C_{21} & C_{22} & C_{23} & C_{24} & C_{25} \\ C_{31} & C_{32} & C_{33} & C_{34} & C_{35} \end{bmatrix} * \begin{bmatrix} C \\ R \\ G \\ B \\ W \end{bmatrix} = \begin{bmatrix} X \\ Y \\ Z \end{bmatrix} \quad (1)$$

where, a matrix composed of $C_{11}$ to $C_{35}$ is a processing matrix; C, R, G, B and W are values acted by the ambient light determined based on the first color temperature signal value and the second color temperature signal value; obtained X, Y and Z are tristimulus values;

acquiring corresponding values under x and y color coordinates based on the obtained tristimulus values according to following formula (2):

$$x = \frac{X}{X+Y+Z} \quad (2)$$
$$y = \frac{Y}{X+Y+Z}$$

calculating the color temperature of the ambient light T by polynomial calculation based on the obtained corresponding values under the x and y color coordinates by following formula (3):

$$T = -449 * \left(\frac{x-0.332}{y-0.1858}\right)^3 + 3525 * \left(\frac{x-0.332}{y-0.1858}\right)^2 - 6823.3 \left(\frac{x-0.332}{y-0.1858}\right)^1 + 5520.33. \quad (3)$$

2. The electronic device according to claim 1, wherein each of the display screen and the filter element further include a polarizer, where the polarizer in the display screen has a first polarization direction, and the polarizer in the filter element has a second polarization direction that is orthogonal to the first polarization direction.

3. The electronic device according to claim 2, wherein the polarizer in the filter element is covered on the second color temperature sensor.

4. The electronic device according to claim 1, wherein:
the first color temperature sensor and the second color temperature sensor are multi-spectral color temperature sensors, and
the processing element is configured to determine the color temperature of ambient light of the environment where the electronic device is located based on the first color temperature signal value in a preset spectral segment detected by the first color temperature sensor and the second color temperature signal value in a preset spectral segment detected by the second color temperature sensor, wherein the preset spectral segment contains at least two different wavelengths of light.

5. A method for measuring color temperature of ambient light that is applied to an electronic device having a display screen, the method comprising:

acquiring a first color temperature signal value detected by a first color temperature sensor, the first color temperature signal value being formed by display light of the display screen acting on the first color temperature sensor alone after ambient light is filtered by a filter element;

acquiring a second color temperature signal value detected by a second color temperature sensor, the second color temperature signal value being formed by the ambient light and the display light jointly acting on the second color temperature sensor; and determining the color temperature of the ambient light according to the first color temperature signal value and the second color temperature signal value, wherein the first color temperature sensor and the second color temperature sensor are arranged side by side at intervals under the display screen, and an interval between the first color temperature sensor and the second color temperature sensor is set to be within a preset range, wherein a matrix algorithm is used to determine the color temperature of the ambient light according to the first color temperature signal value and the second color temperature signal value, steps of the matrix algorithm are as follows:

$$\begin{bmatrix} C_{11} & C_{12} & C_{13} & C_{14} & C_{15} \\ C_{21} & C_{22} & C_{23} & C_{24} & C_{25} \\ C_{31} & C_{32} & C_{33} & C_{34} & C_{35} \end{bmatrix} * \begin{bmatrix} C \\ R \\ G \\ B \\ W \end{bmatrix} = \begin{bmatrix} X \\ Y \\ Z \end{bmatrix} \quad (1)$$

where, a matrix composed of $C_{11}$ to $C_{35}$ is a processing matrix; C, R, G, B and W are values acted by the ambient light determined based on the first color temperature signal value and the second color temperature signal value; obtained X, Y and Z are tristimulus values;

acquiring corresponding values under x and y color coordinates based on the obtained tristimulus values according to following formula (2):

$$x = \frac{X}{X+Y+Z} \quad (2)$$
$$y = \frac{Y}{X+Y+Z}$$

calculating the color temperature of the ambient light T by polynomial calculation based on the obtained corresponding values under the x and y color coordinates by following formula (3):

$$T = -449 * \left(\frac{x-0.332}{y-0.1858}\right)^3 + \quad (3)$$

-continued $$3525*\left(\frac{x-0.332}{y-0.1858}\right)^2 - 6823.3\left(\frac{x-0.332}{y-0.1858}\right)^1 + 5520.33.$$

6. A non-transitory computer-readable storage medium, wherein instructions in the storage medium, when executed by the processor of the computer, cause the computer to execute the method for measuring color temperature of ambient light according to claim 5.

7. The method according to claim 5, wherein:
the first color temperature sensor and the second color temperature sensor are multi-spectral color temperature sensors, each of the first color temperature signal value and the second color temperature signal value includes a color temperature signal value in a preset spectral segment, and the preset spectral segment contains at least two different wavelengths of light, and
the determining the color temperature of the ambient light according to the first color temperature signal value and the second color temperature signal value further includes determining the color temperature of the ambient light according to the first color temperature signal value and the second color temperature signal value in the preset spectral segment.

8. The method according to claim 7, wherein:
the color temperature signal value in the preset spectral segment includes a component corresponding to infrared light, and the method further comprises removing the component corresponding to the infrared light in the first color temperature signal value and the second color temperature signal value in the preset spectral segment, and
the determining the color temperature of the ambient light according to the first color temperature signal value and the second color temperature signal value in the preset spectral segment includes determining the color temperature of the ambient light according to the first color temperature signal value and the second color temperature signal value in the preset spectral segment after removing the component corresponding to the infrared light.

9. The method according to claim 8, wherein the determining the color temperature of the ambient light according to the first color temperature signal value and the second color temperature signal value in the preset spectral segment after removing the component corresponding to the infrared light further comprises:
determining an action value of the display light on the multi-spectral first color temperature sensor according to the second color temperature signal value in the preset spectral segment after removing the component corresponding to the infrared light;
subtracting the action value of the display light on the multi-spectral first color temperature sensor from the first color temperature signal value in the preset spectral segment after removing the component corresponding to the infrared light in order to obtain an action value of the ambient light in the preset spectral segment; and
determining the color temperature of the ambient light according to the action value of the ambient light in the preset spectral segment.

10. The method according to claim 9, wherein the method further comprises:
determining an influence factor of the filter element on the light of different wavelengths contained in the display light according to color temperature signal values respectively detected by the first color temperature sensor and the second color temperature sensor in corresponding spectral segments under preset dark light conditions,
wherein the determining an action value of the display light on the multi-spectral first color temperature sensor according to the first color temperature signal value in the preset spectral segment after removing the component corresponding to the infrared light further comprises:
determining an action value of display light on the multi-spectral first color temperature sensor according to the first color temperature signal value in the preset spectral segment after removing the component corresponding to the infrared light and the influence factor of the filter element on the light of different wavelengths contained in the display light.

11. The method according to claim 10, the method further comprising:
controlling the display screen to respectively display images of colors corresponding to the spectral segments under the preset dark light conditions; and
acquiring a first signal value detected by the first color temperature sensor and a second signal value detected by the second color temperature sensor when the display screen displays an image of a color corresponding to the spectral segment,
wherein the determining an influence factor of the filter element on the light of different wavelengths contained in the display light based on color temperature signal values respectively detected by the first color temperature sensor and the second color temperature sensor in corresponding spectral segments under preset dark light conditions further comprises:
determining the influence factor of the filter element on the light of different wavelengths contained in the display light according to the first signal value and the second signal value when the display screen displays images of different colors.

12. The method according to claim 11, wherein:
the acquiring a first signal value detected by the first color temperature sensor and a second signal value detected by the second color temperature sensor when the display screen displays an image of a color corresponding to the spectral segment further comprises:
acquiring the first signal value detected by the first color temperature sensor and the second signal value detected by the second color temperature sensor respectively when the display screen displays images of colors corresponding to the spectral segments with different types of light sources, and
the determining the influence factor of the filter element on the light of different wavelengths contained in the display light according to the first signal value and the second signal value when the display screen displays images of different colors further comprises:
determining an average value of ratios of the first signal values and the second signal values when the display screen displays the image of the corresponding color of the spectral segment with different types of light sources; and
determining the average value of the ratios in the preset spectral segment as the influence factor of the filter element on the light of different wavelengths contained in the display light.

13. An apparatus for measuring color temperature of ambient light, comprising:
a processor;
a memory for storing instructions executable by the processor,
wherein the processor is configured to:
acquire a first color temperature signal value detected by a first color temperature sensor, the first color temperature signal value being formed by display light of the display screen acting on the first color temperature sensor alone after ambient light is filtered by a filter element;
acquire a second color temperature signal value detected by a second color temperature sensor, the second color temperature signal value being formed by the ambient light and the display light jointly acting on the second color temperature sensor; and
determine the color temperature of the ambient light according to the first color temperature signal value and the second color temperature signal value,
wherein the first color temperature sensor and the second color temperature sensor are arranged side by side at intervals under the display screen, and an interval between the first color temperature sensor and the second color temperature sensor is set to be within a preset range,
wherein a matrix algorithm is used to determine the color temperature of the ambient light according to the first color temperature signal value and the second color temperature signal value, steps of the matrix algorithm are as follows:

$$\begin{bmatrix} C_{11} & C_{12} & C_{13} & C_{14} & C_{15} \\ C_{21} & C_{22} & C_{23} & C_{24} & C_{25} \\ C_{31} & C_{32} & C_{33} & C_{34} & C_{35} \end{bmatrix} * \begin{bmatrix} C \\ R \\ G \\ B \\ W \end{bmatrix} = \begin{bmatrix} X \\ Y \\ Z \end{bmatrix} \quad (1)$$

where, a matrix composed of $C_{11}$ to $C_{35}$ is a processing matrix; C, R, G, B and W are values acted by the ambient light determined based on the first color temperature signal value and the second color temperature signal value; obtained X, Y and Z are tristimulus values;
acquiring corresponding values under x and y color coordinates based on the obtained tristimulus values according to following formula (2);

$$x = \frac{X}{X+Y+Z} \quad (2)$$
$$y = \frac{Y}{X+Y+Z}$$

calculating the color temperature of the ambient light T by polynomial calculation based on the obtained corresponding values under the x and y color coordinates by following formula (3):

$$T = -449 * \left(\frac{x-0.332}{y-0.1858}\right)^3 + 3525 * \left(\frac{x-0.332}{y-0.1858}\right)^2 - 6823.3 \left(\frac{x-0.332}{y-0.1858}\right)^1 + 5520.33. \quad (3)$$

14. The apparatus according to claim 13, wherein:
the first color temperature sensor and the second color temperature sensor are multi-spectral color temperature sensors, each of the first color temperature signal value and the second color temperature signal value includes a color temperature signal value in a preset spectral segment, and the preset spectral segment contains at least two different wavelengths of light, and
the processor is further configured to determine the color temperature of the ambient light according to the first color temperature signal value and the second color temperature signal value in the preset spectral segment.

15. The apparatus according to claim 14, wherein the color temperature signal value in the preset spectral segment includes a component acted on by infrared light, and the processor is further configured to:
remove the component acted on by the infrared light in the first color temperature signal value and the second color temperature signal value in the preset spectral segment; and
determine the color temperature of the ambient light according to the first color temperature signal value and the second color temperature signal value in the preset spectral segment after removing the component acted on by the infrared light.

16. The apparatus according to claim 15, the processor being further configured to:
determine an action value of the display light on the multi-spectral first color temperature sensor based on the second color temperature signal value in the preset spectral segment after removing the component corresponding to by the infrared light;
subtract the action value of the display light on the multi-spectral first color temperature sensor from the first color temperature signal value in the preset spectral segment after removing the component corresponding to the infrared light to obtain an action value of the ambient light in the preset spectral segment; and
determine the color temperature of the ambient light base on the action value of the ambient light in the preset spectral segment.

17. The apparatus according to claim 16, the processor being further configured to:
determine an influence factor of the filter element on the light of different wavelengths contained in the display light based on color temperature signal values respectively detected by the first color temperature sensor and the second color temperature sensor in corresponding spectral segments under preset dark light conditions; and
determine an action value of display light on the multi-spectral first color temperature sensor based on the first color temperature signal value in the preset spectral segment after removing the component corresponding to the infrared light and the influence factor of the filter element on the light of different wavelengths contained in the display light.

18. The apparatus according to claim 17, the processor being further configured to:
control the display screen to respectively display images of colors corresponding to the spectral segments under the preset dark light conditions;
acquire a first signal value detected by the first color temperature sensor and a second signal value detected by the second color temperature sensor when the display screen displays an image of a color corresponding to the spectral segment; and determine the influence factor of the filter element on the light of different wavelengths contained in the display light based on the first signal value and the second signal value when the display screen displays images of different colors.

19. The apparatus according to claim 18, the processor being further configured to:
acquire the first signal value detected by the first color temperature sensor and the second signal value detected by the second color temperature sensor respectively when the display screen displays images of colors corresponding to the spectral segments with different types of light sources;
determine an average value of ratios of the first signal values and the second signal values when the display screen displays the image of the corresponding color of the spectral segment with different types of light sources; and
determine the average value of the ratios in the preset spectral segment as the influence factor of the filter element on the light of different wavelengths contained in the display light.

* * * * *